(12) United States Patent
Narovlansky et al.

(10) Patent No.: US 9,267,583 B2
(45) Date of Patent: Feb. 23, 2016

(54) GEAR ASSEMBLY AND USE IN CYLINDER LOCK

(71) Applicants: Boris Narovlansky, Ashdod (IL); Yair Levy, Almagor (IL)

(72) Inventors: Boris Narovlansky, Ashdod (IL); Yair Levy, Almagor (IL)

(73) Assignee: Mul-T-Lock Technologies Ltd., Yavne (IL)

( * ) Notice: Subject to any disclaimer, the term of this patent is extended or adjusted under 35 U.S.C. 154(b) by 0 days.

(21) Appl. No.: 14/377,193

(22) PCT Filed: Feb. 6, 2013

(86) PCT No.: PCT/US2013/024837
§ 371 (c)(1),
(2) Date: Aug. 7, 2014

(87) PCT Pub. No.: WO2013/130223
PCT Pub. Date: Sep. 6, 2013

(65) Prior Publication Data
US 2015/0040695 A1    Feb. 12, 2015

(30) Foreign Application Priority Data
Feb. 14, 2012  (IL) .......................... 218105

(51) Int. Cl.
*F16H 19/02*    (2006.01)
*E05B 47/00*    (2006.01)
*E05B 47/06*    (2006.01)
*E05B 17/04*    (2006.01)
(Continued)

(52) U.S. Cl.
CPC .............. *F16H 19/02* (2013.01); *E05B 17/042* (2013.01); *E05B 47/0012* (2013.01); *E05B 47/0611* (2013.01); *F16H 25/08* (2013.01); *E05B 53/008* (2013.01); *E05B 2017/043* (2013.01); *F16H 2001/326* (2013.01); *Y10T 74/18248* (2015.01)

(58) Field of Classification Search
CPC .............. E05B 17/042; E05B 47/0012; E05B 2017/043; E05B 47/0611; E05B 53/008; E05B 17/047; E05B 81/06; E05B 2047/002; E05B 2047/0028; E05B 47/063; F16H 19/02; F16H 25/08
USPC ................... 70/275, 277, 190, 191
See application file for complete search history.

(56) References Cited

U.S. PATENT DOCUMENTS 3,383,886 A    5/1968  Hermann
3,748,878 A *  7/1973  Balzano et al. ............. 70/218
(Continued)

FOREIGN PATENT DOCUMENTS

DE    2927008    *  1/1981
DE    4127051       2/1993
(Continued)

OTHER PUBLICATIONS

PCT Written Opinion PCT/US2013/024837, Aug. 22, 2013.

*Primary Examiner* — Suzanne Barrett
(74) *Attorney, Agent, or Firm* — Dekel Patent Ltd.; David Klein

(57) ABSTRACT

An assembly including a cylinder lock including a rotatable member for actuating an external locking element, and a reduction gear disposed inside the cylinder lock, the reduction gear mechanically linked to the rotatable member and operable to rotate the rotatable member, the reduction gear including an interface member for connection to an actuator for movement of the reduction gear.

8 Claims, 5 Drawing Sheets

(51) Int. Cl.
  *F16H 25/08* (2006.01)
  *E05B 53/00* (2006.01)
  *F16H 1/32* (2006.01)

(56) References Cited

U.S. PATENT DOCUMENTS

| | | | |
|---|---|---|---|
| 3,990,281 A | 11/1976 | Meder | |
| 5,437,174 A * | 8/1995 | Aydin | 70/278.3 |
| 5,820,504 A * | 10/1998 | Geralde | 475/177 |
| 5,823,027 A | 10/1998 | Glick | |
| 5,848,541 A * | 12/1998 | Glick et al. | 70/278.3 |
| 6,418,764 B1 * | 7/2002 | Lerchner | 70/279.1 |
| 7,007,526 B2 * | 3/2006 | Frolov et al. | 70/277 |
| 8,689,594 B2 * | 4/2014 | Yanar et al. | 70/279.1 |
| 2005/0184265 A1 * | 8/2005 | Aoki et al. | 251/248 |
| 2006/0035742 A1 * | 2/2006 | Peter et al. | 475/163 |
| 2006/0283218 A1 * | 12/2006 | Dolev | 70/379 R |
| 2007/0115094 A1 * | 5/2007 | Gillert et al. | 340/5.61 |
| 2009/0031769 A1 * | 2/2009 | Dolev | 70/367 |

FOREIGN PATENT DOCUMENTS

| | | |
|---|---|---|
| DE | 29621441 | 2/1997 |
| DE | 102005039350 | 8/2005 |
| DE | 102006020614 A1 * | 11/2006 |
| DE | 102005039350 A1 * | 2/2007 |
| DE | 102008056627 B3 * | 6/2010 |
| EP | 0962612 | 12/1999 |
| EP | 1582666 | 10/2005 |
| EP | 2096239 | 9/2009 |
| FR | 1130794 | 2/1957 |
| JP | 2012246946 A * | 12/2012 |

\* cited by examiner

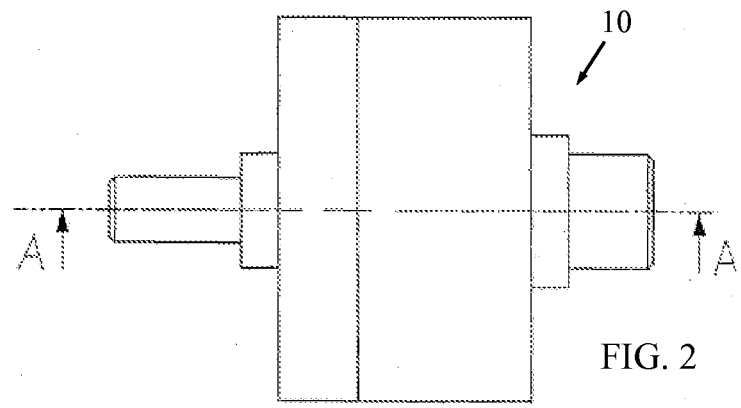
FIG. 2
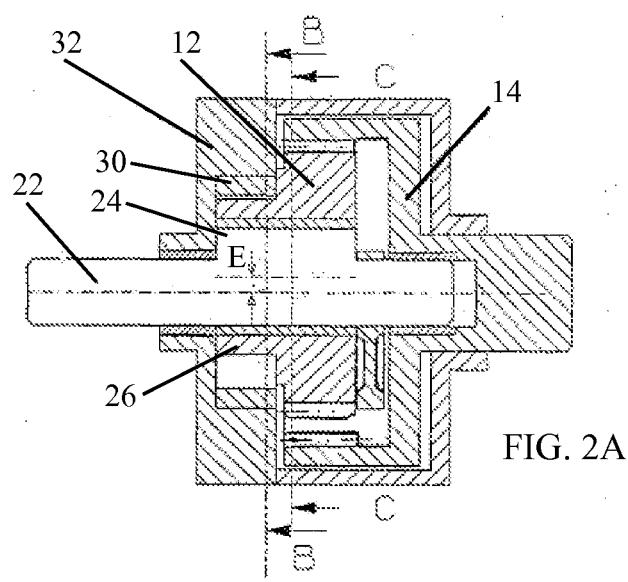
FIG. 2A
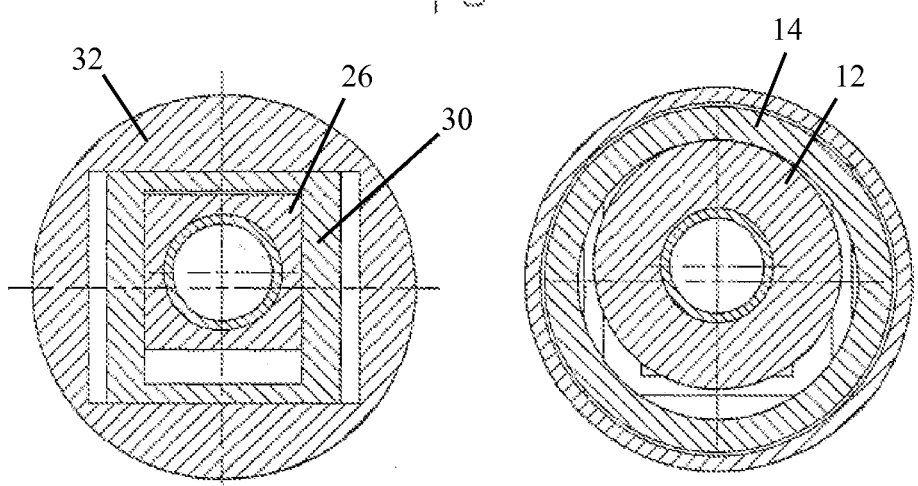
FIG. 2B
FIG. 2C

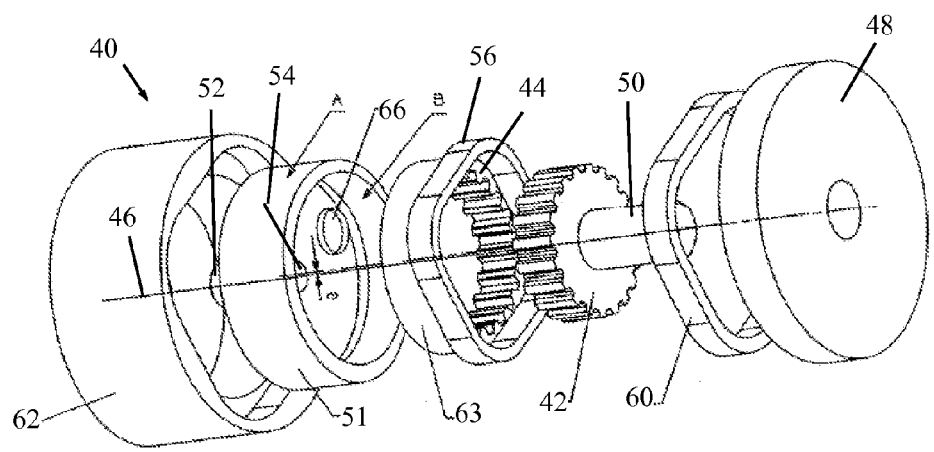
FIG. 4
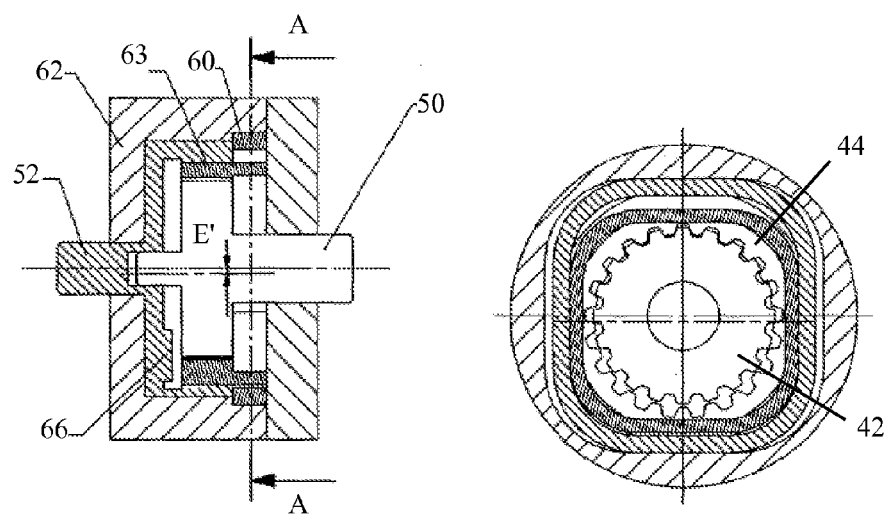
FIG. 5
FIG. 5A

GEAR ASSEMBLY AND USE IN CYLINDER LOCK

FIELD OF THE INVENTION

The present invention relates to gear assemblies and locking apparatus generally, and more particularly to a compact gear assembly, which among other uses, may fit in a plug bore in a cylinder lock for electromechanical operation of the cylinder lock.

BACKGROUND OF THE INVENTION

As is well known in the art, there are many electromechanical cylinder locks operated by an electric motor that turns a locking element in a motor-driven cylinder lock.

Known prior art systems use motors that require a reduction in rotational speed to operate the motor-driven cylinder lock. The known reduction gears are large and must be located outside the cylinder lock.

SUMMARY OF THE INVENTION

The present invention seeks to provide a novel compact gear assembly, typically used as a reduction gear, which among other uses, may fit in a plug bore in a cylinder lock for electromechanical operation of the cylinder lock, as is described more in detail hereinbelow. Thus, in one of its uses, the gear assembly resides in the cylinder lock.

There is thus provided in accordance with an embodiment of the present invention an assembly including a cylinder lock including a rotatable member for actuating an external locking element, and a reduction gear disposed inside the cylinder lock, the reduction gear mechanically linked to the rotatable member and operable to rotate the rotatable member, the reduction gear including an interface member for connection to an actuator for movement of the reduction gear.

Non-limiting embodiments of the invention include one or more of the following features.

The reduction gear includes an inner gear and an outer gear, the outer gear arranged for rotation about a rotation axis.

The rotatable member and the reduction gear are both arranged for rotation about the rotation axis.

The inner gear is arranged for translational movement, wherein during translational movement of the inner gear, the inner gear meshes with the outer gear and causes the outer gear to rotate about the rotation axis. The inner gear does not rotate.

The inner gear is mounted on a shaft that includes an eccentric member which is eccentric to the rotation axis, and during rotation of the shaft about the rotation axis, the eccentric member causes the inner gear to move in the translational movement.

A limiter constrains the translational movement of the inner gear within defined limits, the limiter not extending beyond outer teeth of the inner gear. The limiter is a straight-sided member that extends axially from the inner gear, the limiter being arranged for movement in an inner periphery of a first boundary member. An outer perimeter of the first boundary member is straight-sided, and the first boundary member is arranged for movement in an inner periphery of a second boundary member, and the first and second boundary members are mounted on the shaft.

Alternatively, there may be an embodiment wherein the inner gear rotates about the rotation axis.

There is also provided in accordance with an embodiment of the present invention a gear assembly including an inner gear and an outer gear, the outer gear arranged for rotation about a rotation axis and the inner gear arranged for translational movement, wherein during translational movement of the inner gear, the inner gear meshes with the outer gear and causes the outer gear to rotate about the rotation axis, and a limiter that constrains the translational movement of the inner gear within defined limits, the limiter not extending beyond outer teeth of the inner gear.

There is also provided in accordance with an embodiment of the present invention a gear assembly including an inner gear and an outer gear, the inner gear arranged for rotation about a rotation axis and the outer gear arranged for translational movement, wherein during translational movement of the outer gear, the outer gear meshes with the inner gear and causes the inner gear to rotate about the rotation axis. This embodiment may be used for increasing the input rotational speed instead of reducing the input speed.

BRIEF DESCRIPTION OF THE DRAWINGS

The present invention will be understood and appreciated more fully from the following detailed description, taken in conjunction with the drawings in which:

FIG. 2 is a simplified side view of the reduction gear of FIG. 1; FIG. 2A is a simplified sectional view of the reduction gear of FIG. 2, taken along lines A-A in FIG. 2;

FIG. 2B is a simplified sectional view of the reduction gear of FIG. 2, taken along lines B-B in FIG. 2A;

FIG. 2C is a simplified sectional view of the reduction gear of FIG. 2, taken along lines C-C in FIG. 2A;

FIG. 4 is a simplified pictorial illustration of a gear assembly, constructed and operative in accordance with another embodiment of the present invention;

FIG. 5 is a simplified side sectional view of the gear assembly of FIG. 4;

FIG. 5A is a simplified sectional view of the gear assembly of FIG. 5, taken along lines A-A in FIG. 5.

DETAILED DESCRIPTION OF EMBODIMENTS

Figure 1:
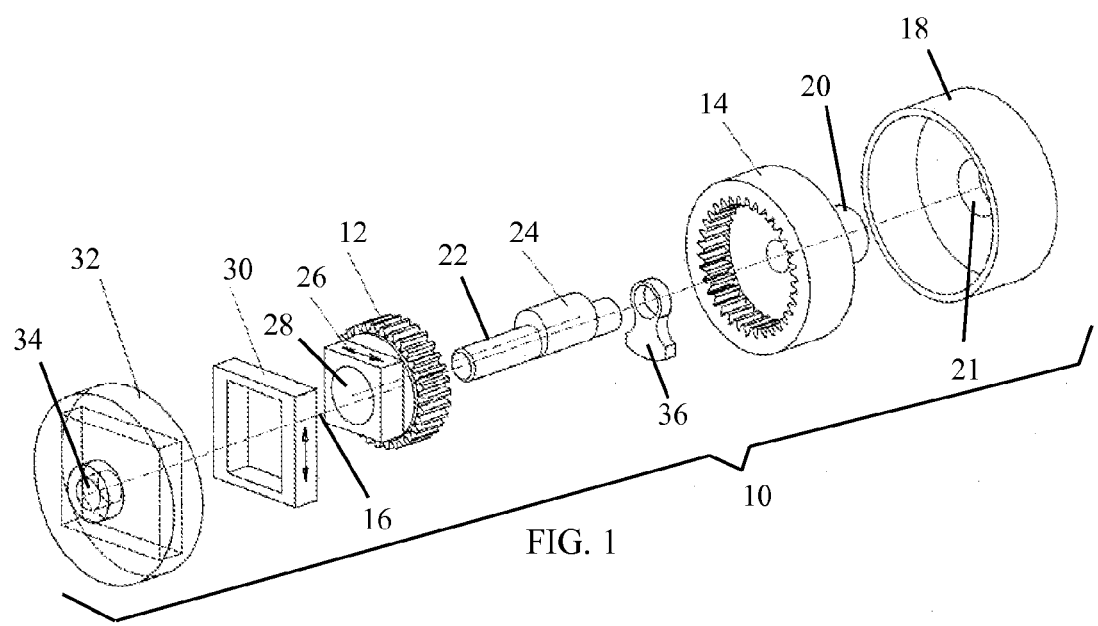
FIG. 1 is a simplified pictorial illustration of a reduction gear, constructed and operative in accordance with an embodiment of the present invention.

Reference is now made to FIGS. 1-2C, which illustrates a reduction gear 10, constructed and operative in accordance with a non-limiting embodiment of the present invention.

In the illustrated embodiment, reduction gear 10 includes an inner gear 12 and an outer gear 14. Outer gear 14 is arranged for rotation about a rotation axis 16. Outer gear 14 is journaled in a housing 18 and has an output shaft 20 that extends outwards from housing 18. The bearing surface is preferably the output shaft 20 rotating in a hole 21 formed in housing 18 (with optional bearing elements or lubrication material, for example) or the outer contour of the outer gear 14 rotating in housing 18 (with optional bearing elements or lubrication material, for example).

Inner and outer gears 12 and 14 are mounted on a shaft 22, which rotates about rotation axis 16. However, in contrast to outer gear 14, inner gear 12 is arranged for translational movement and does not rotate. Shaft 22 includes an eccentric member 24 which is eccentric to rotation axis 16 (eccentricity E shown in FIG. 2A). During rotation of shaft 22 about rotation axis 16, eccentric member 24 causes inner gear 12 to move in the translational movement. During its translational movement, inner gear 12 meshes with outer gear 14 and causes outer gear 14 to rotate about rotation axis 16, as will be explained more in detail below.

A limiter 26 is provided that constrains the translational movement of inner gear 12 within defined limits. The limiter 26 does not extend beyond the outer teeth of inner gear 12, which is one of the reasons reduction gear 10 is such a compact assembly.

In the illustrated embodiment, limiter 26 is a straight-sided member that extends axially from inner gear 12. Limiter 26 is shown as having four sides, which is considered an optimal number, but the invention is not in any way limited to this configuration. Limiter 26 and inner gear 12 have a common through hole 28 for mounting on shaft 22. Through hole 28 is large enough to accommodate the movement of eccentric member 24, and is thus oversized compared to the outer diameter of the shaft 22.

Limiter 26 is arranged for movement in an inner periphery of a first boundary member 30. First boundary member 30 has straight-sided inner and outer contours. The inner contour accommodates the shape of limiter 26 but is larger than the outer contour of limiter 26 to allow for linear movement of limiter 26 therein.

First boundary member 30 is arranged for movement in an inner periphery of a second boundary member 32. First and second boundary members 30 and 32 are mounted on shaft 22 as well. As seen best in FIG. 2A, shaft 22 is journaled in a mounting hole 34 formed in second boundary member 32 (with optional bearing elements or lubrication material, for example). The portion of shaft 22 that extends outwards of second boundary member 32 is an interface member for connection to an actuator (e.g., a servomotor and the like, not shown) for movement of the reduction gear 10.

A counterweight 36 may be mounted on shaft 22 for balancing with the eccentric member 24.

Reference is now made to FIGS. 3A-3F, which illustrate inner gear 12 translating and causing rotation of outer gear 14, in accordance with an embodiment of the present invention.

The reference axes are $X_0$ and $Y_0$. The Cartesian position of inner gear 12 is shown as coordinates $X_0$ and $Y_0$. The vector showing the angular position of outer gear 14 is designated as $Y_2$.

Figure 3A:
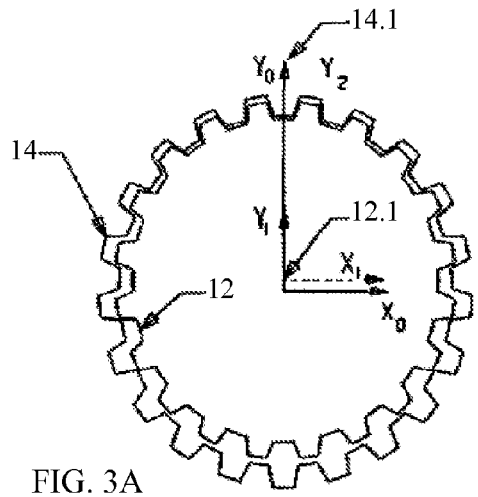
FIGS. 3A-3F are simplified illustrations of the inner gear of the reduction gear translating and causing rotation of the outer gear, in accordance with an embodiment of the present invention.

Initially, as seen in FIG. 3A, inner gear 12 is positioned relative to outer gear 14 such that the upper teeth mesh. The initial position of inner gear 12 is designated 12.1 and initial position of outer gear 14 is designated 14.1.

Figure 3B:
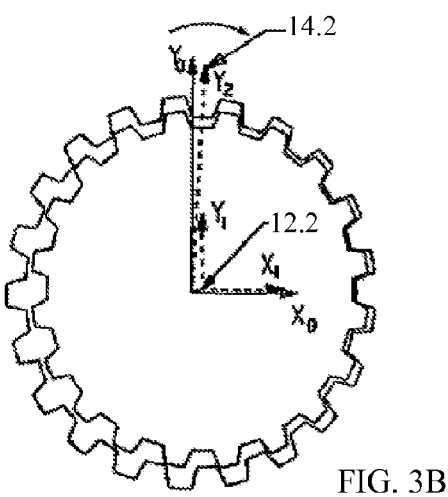

In FIG. 3B, inner gear 12 translates to the right and downwards to position 12.2 (by rotation of the eccentric member, not shown here for simplicity). This causes the uppermost teeth of inner gear 12 to move out of outer gear 14 and the right teeth to mesh with outer gear 14. This causes outer gear 14 to rotate clockwise to position 14.2.

Figure 3C:
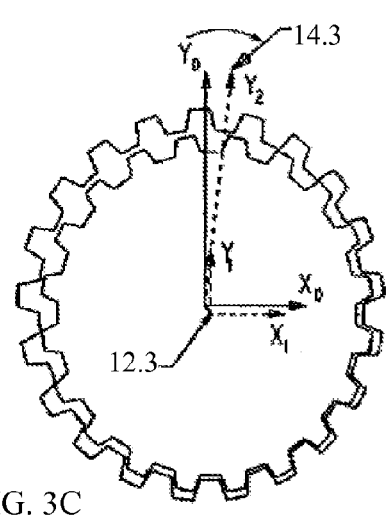

In FIG. 3C, inner gear 12 translates to the left and downwards to position 12.3. This causes the right teeth of inner gear 12 to move out of outer gear 14 and the lower teeth to mesh with outer gear 14. This causes outer gear 14 to further rotate clockwise to position 14.3.

Figure 3D:
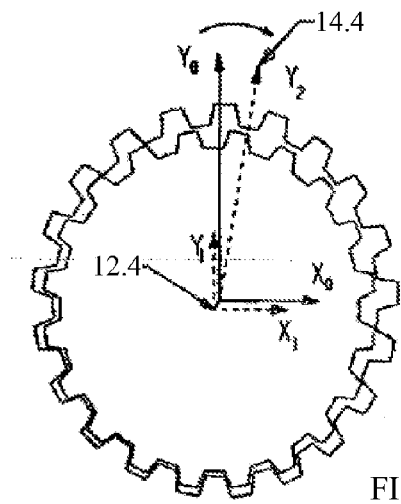

In FIG. 3D, inner gear 12 translates to the left and upwards to position 12.4. This causes the lower teeth of inner gear 12 to move out of outer gear 14 and the lower left teeth to mesh with outer gear 14. This causes outer gear 14 to further rotate clockwise to position 14.4.

Figure 3E:
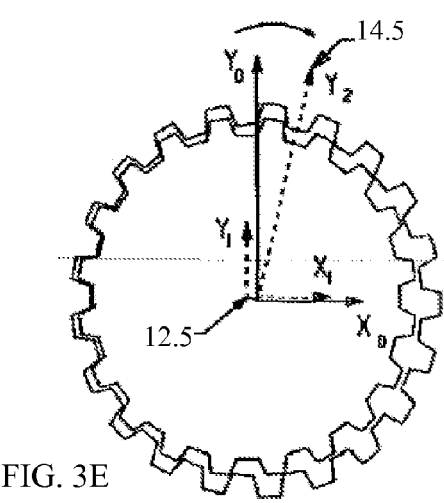

In FIG. 3E, inner gear 12 translates to the left and upwards to position 12.5. This causes the lower left teeth of inner gear 12 to move out of outer gear 14 and the more upper left teeth to mesh with outer gear 14. This causes outer gear 14 to further rotate clockwise to position 14.5.

Figure 3F:
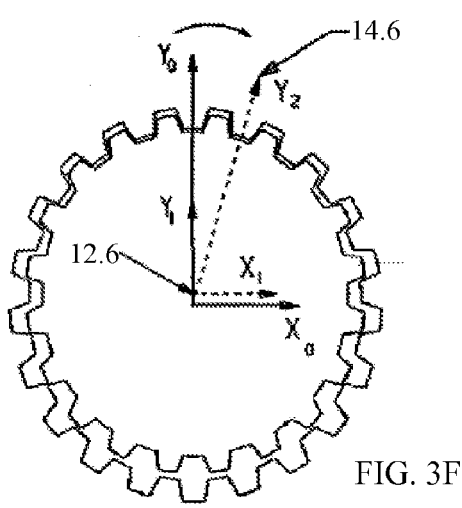

In FIG. 3F, inner gear 12 translates to the right and upwards to position 12.4. This causes the left teeth of inner gear 12 to move out of outer gear 14 and the upper teeth to mesh with outer gear 14. This causes outer gear 14 to further rotate clockwise to position 14.6. The cycle then repeats itself.

It is noted that reduction gear 10 allows for a very robust construction of the gear teeth. The teeth do not need to be involute; rather the teeth of the inner and outer gears can be straight-sided, with robust thickness. This provides superior strength, significantly reduced bending and contact stresses on the teeth, and increased lifetime. The meshing speed of the teeth is slow because it is governed by the radius of the eccentric member and not by the radius of the inner gear.

Reference is now made to FIGS. 4-5A, which illustrate a gear assembly 40, constructed and operative in accordance with another non-limiting embodiment of the present invention. The elements of gear assembly 40 are similar to those of reduction gear 10, but in this embodiment the roles are reversed: the outer gear translates and rotates the inner gear.

In the illustrated embodiment, gear assembly 40 includes an inner gear 42 and an outer gear 44. Inner gear 42 is arranged for rotation about a rotation axis 46. Inner gear 42 is journaled in a housing 48 and has an output shaft 50 that extends outwards from housing 48. A rotating member 51 has a shaft 52, which rotates about rotation axis 46. Shaft 52 includes an eccentric member 54 which is eccentric to rotation axis 46 (eccentricity E' shown in FIG. 4). There may be a counterweight 66.

A limiter 56 is provided that constrains the translational movement of outer gear 44 within defined limits. In the illustrated embodiment, limiter 56 is a straight-sided member that extends axially from outer gear 44. Limiter 56 is arranged for movement in an inner periphery of a first boundary member 60. First boundary member 60 is arranged for movement in an inner periphery of a second boundary member 62. During rotation of shaft 52 about rotation axis 46, eccentric member 54 moves against a hub 63 of first boundary member 60 and causes outer gear 44 to move in the translational movement. During its translational movement, outer gear 44 meshes with inner gear 42 and causes inner gear 42 to rotate about rotation axis 46, in a manner similar to that explained above for reduction gear 10.

Figure 6A:
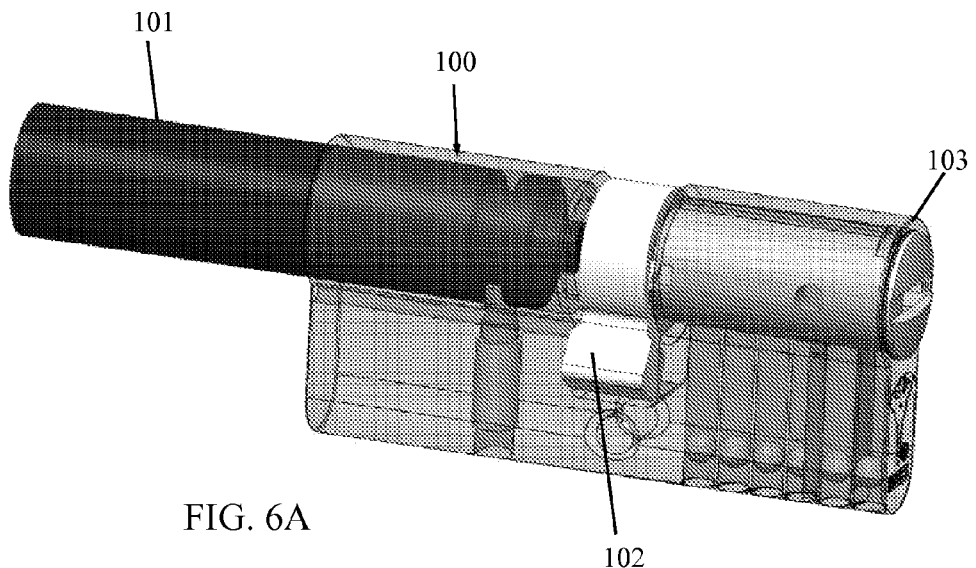
FIGS. 6A and 6B are simplified pictorial and exploded illustrations of a cylinder lock, constructed and operative in accordance with an embodiment of the present invention, wherein a reduction gear is inside the cylinder lock.
Figure 6B:
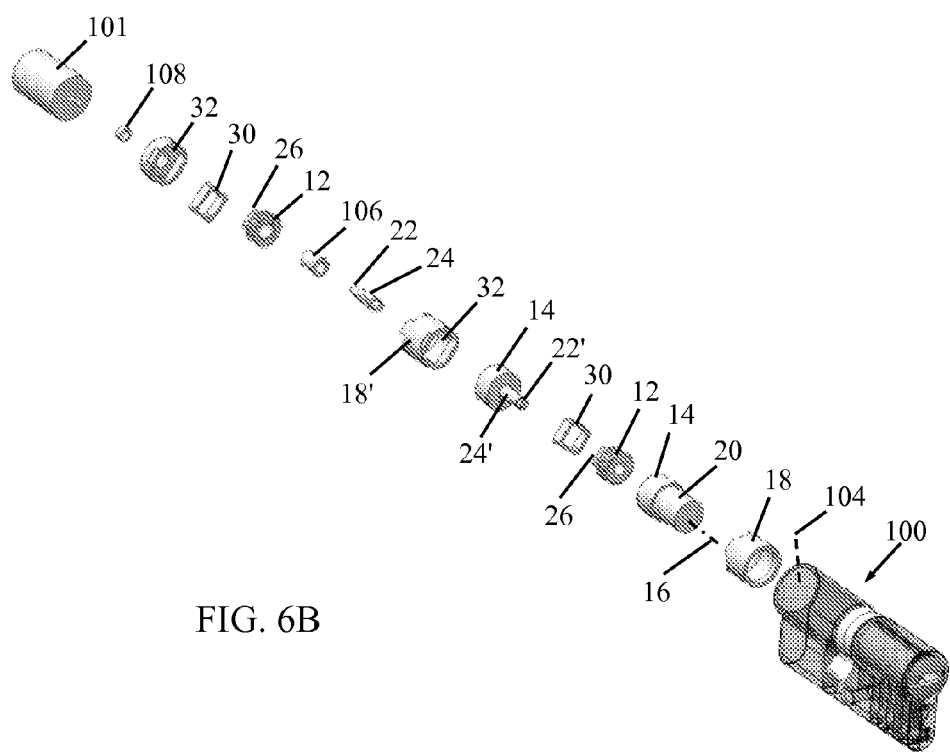

Reference is now made to FIGS. 6A-6B, which illustrate a cylinder lock 100, constructed and operative in accordance with an embodiment of the present invention, wherein reduction gear 10 is inside the cylinder lock 100.

Cylinder lock 100 is shown as a double cylinder lock with a European profile. More specifically, the illustrated embodiment is a motor-driven cylinder lock, driven by motor 101, which is in-line with a key-operated cylinder lock 103 and they both actuate a common external locking element (i.e., external to the cylinder), typically a centrally located rotatable cam 102. The motor-driven cylinder lock is typically on the inside of the door and may be operated by an authorized person, such as by means of a transponder in a key which activates motor 101 (such as by RFID) or by a biometric sensor that senses a biometric parameter of the authorized person (e.g., fingerprints and the like) and operates motor 101. The outer cylinder lock 103 is key-operated, and can be designed as a mechanical override for use under certain conditions.

However, the invention is not limited to this configuration and can also be carried out for a single cylinder lock and for any kind of profile.

In the illustrated embodiment, on the right side of FIG. 6B, it is seen that housing 18 is journaled inside a plug bore 104 of cylinder lock 100. The output shaft 20 of outer gear 14 is dimensioned to interface directly or indirectly with the cam 102. The reduction gear can be a single stage reduction gear, comprising the elements on the right side of FIG. 6B.

An alternate embodiment is shown in FIG. 6B, which is a double stage reduction gear. In this embodiment, another set of inner and outer gears is provided. The two stages cooperate as follows. The first boundary member 30 of the right-side stage is arranged for movement in the second boundary member 32, as described above. The second boundary member 32 is part of a housing 18' which is the housing for the left-side stage (the stage that connects to the motor). The output shaft of the left-side-stage outer gear 14 is designated 22' and it serves as the shaft 22' with eccentric member 24' for the right-side-stage inner gear 12 and outer gear 14.

The shaft 22 of the left-side stage may be journaled in a bushing 106 and end cap 108 for interfacing with the shaft of motor 101.

Optionally, the reduction gear in the cylinder lock can be of the type wherein both the inner and outer gears rotate, such as but not limited to, harmonic drive reduction gears or planetary-friction type speed change devices that have a plurality of planetary rolling elements disposed between a sun roller and an outer ring, such as described in U.S. Pat. No. 5,423,725, the disclosure of which is incorporated herein by reference.

What is claimed is:

1. A lock assembly comprising:
    a cylinder lock comprising a rotatable member for actuating an external locking element;
    a reduction gear disposed inside said cylinder lock, said reduction gear mechanically linked to said rotatable member and operable to rotate said rotatable member, said reduction gear comprising an interface member for connection to an actuator for movement of said reduction gear, and wherein said reduction gear comprises an inner gear and an outer gear, said outer gear arranged for rotation about a rotation axis; and
    a limiter that constrains movement of said inner gear within defined limits, said limiter not extending beyond outer teeth of said inner gear.

2. The lock assembly according to claim 1, wherein said rotatable member and said reduction gear are both arranged for rotation about said rotation axis.

3. The lock assembly according to claim 1, wherein said inner gear is arranged for translational movement, wherein during translational movement of said inner gear, said inner gear meshes with said outer gear and causes said outer gear to rotate about said rotation axis.

4. The lock assembly according to claim 1, wherein said inner gear does not rotate.

5. The lock assembly according to claim 3, wherein said inner gear is mounted on a shaft that comprises an eccentric member which is eccentric to said rotation axis, and during rotation of said shaft about said rotation axis, said eccentric member causes said inner gear to move in said translational movement.

6. The lock assembly according to claim 3, wherein said limiter constrains said translational movement of said inner gear within the defined limits.

7. The lock assembly according to claim 6, wherein said limiter is a straight-sided member that extends axially from said inner gear, said limiter being arranged for movement in an inner periphery of a first boundary member.

8. The lock assembly according to claim 7, wherein an outer perimeter of said first boundary member is straight-sided, and said first boundary member is arranged for movement in an inner periphery of a second boundary member, and said first and second boundary members are mounted on said shaft.

* * * * *